Oct. 13, 1931.    J. H. HUNTER    1,827,086
CONDUIT SYSTEM
Filed April 13, 1925    2 Sheets-Sheet 1
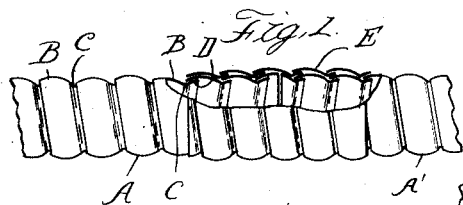
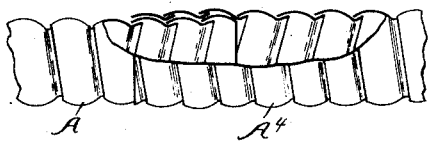
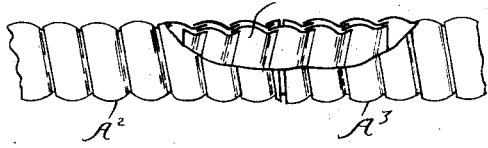
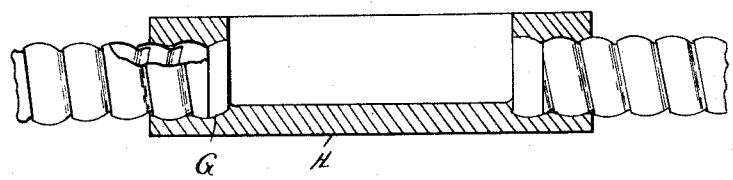
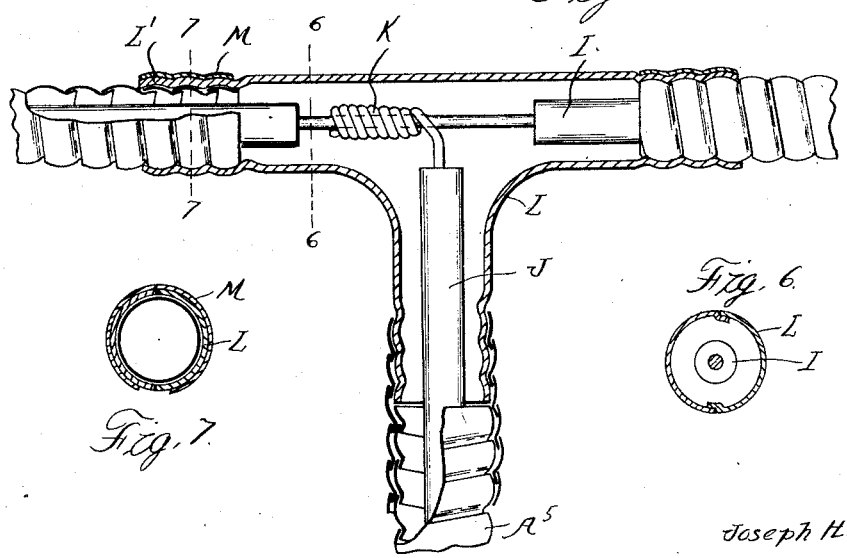
Inventor
Joseph H. Hunter
By Whittemore Hulbert Whittemore
+Belknap    Attorneys Oct. 13, 1931.  J. H. HUNTER  1,827,086
CONDUIT SYSTEM
Filed April 13, 1925   2 Sheets-Sheet 2
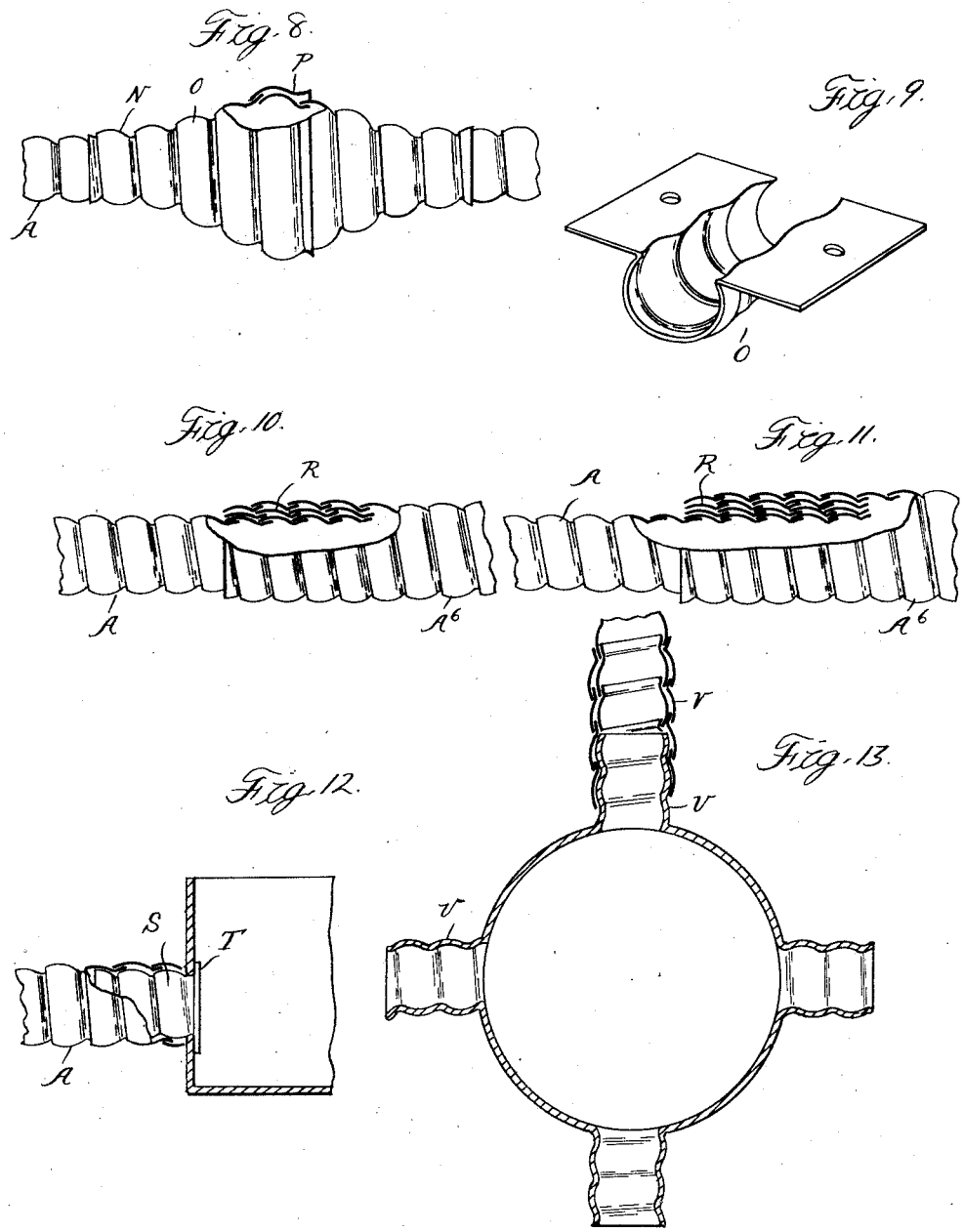

Patented Oct. 13, 1931

1,827,086

UNITED STATES PATENT OFFICE

JOSEPH H. HUNTER, OF DETROIT, MICHIGAN, ASSIGNOR, BY MESNE ASSIGNMENTS, TO GENERAL CABLE CORPORATION, A CORPORATION OF NEW JERSEY

CONDUIT SYSTEM

Application filed April 13, 1925. Serial No. 22,852.

The invention relates to flexible conduit systems more particularly designed for containing electrical conductors and the invention consists in the novel construction and method of installation as hereinafter set forth.

In the drawings:

Figure 1 is a longitudinal section through two conduit sections coupled to each other;

Figure 2 is a similar view of a modified construction;

Figure 3 illustrates two conduit sections of different diameters screwed into engagement with each other;

Figure 4 shows a conduit connected with an outlet fitting;

Figure 5 illustrates a T-connection between conduit sections;

Figures 6 and 7 are cross sections on lines 6—6 and 7—7 of Figure 5;

Figure 8 is a section through a junction box;

Figure 9 is a perspective view of a conduit securing clip;

Figures 10 and 11 are longitudinal sections showing the union of conduit sections varying considerably in diameter;

Figure 12 illustrates the connection of the conduit with an ordinary outlet box;

Figure 13 is a section through a cross coupling for conduit sections.

In the present state of the art one type of flexible conduit which is extensively used is formed from a spirally wound strip of sheet metal so fashioned that the adjacent convolutions will interlock but permit of a limited relative angular movement. Such conduits are frequently used for enclosing electrical conductors, but are not generally used for forming permanently installed conduit systems connected with junction boxes and other fittings. One reason for this is that it has been found difficult to form a satisfactory mechanical joint between such conduits and other fittings.

The present invention involves the novel idea of utilizing the spiral winding primarily designed for flexibility, as a means for joining conduit sections with each other or with other fittings. Thus a permanent conduit system may be readily installed with less labor than is involved where non-flexible conduits are used and possessing the additional advantages of flexibility, ease in adjustment and facilitating replacement or repair.

In specific construction the flexible conduit A which I employ is formed from a spirally wound strip of sheet metal fashioned in cross section to have a convex portion B on one edge thereof, a straight portion C adjacent thereto and an outwardly turned flange D at the opposite edge. Thus the convex portion of one convolution overlaps the straight or cylindrical portion of an adjacent convolution, permitting of a relative sliding movement, while the flange B prevents any disengagement of said convolutions. The conduit A when completely formed has an external convex thread and an internal concave thread so that two conduits differing in diameter by the gauge of the metal are capable of being joined by screwing one into the other. In the same manner such conduit can be engaged with any other fitting either by screwing it into an internally correspondingly threaded nipple or screwing it upon an externally threaded nipple.

As shown in Figure 1, two conduit sections A and A' of the same diameter are joined to each other by a similarly threaded sleeve member E, which may be first screwed completely onto one of said conduits and then screwed backward into engagement with the abutting conduit. In Figure 2 a similar construction is shown where two conduit sections $A^2$ and $A^3$ are joined by an internal correspondingly threaded bushing member F onto which they are screwed. In Figure 3 one conduit section A is screwed into engagement with a similar conduit section $A^4$ of slightly greater diameter. In Figure 4 the conduits A are screwed into threaded sockets G of an outlet fitting H. Figure 5 shows the method of joining a conduit having an installed conductor such as I with a conduit $A^5$ containing a branch conductor J. For this purpose the conduit A is severed or a portion thereof is cut away so as to provide access to the conductor I and permit of splicing the conductor J thereto, as indicated at K.

A two part junction box L having threaded nipples L' is then placed over the joint with the threaded nipples engaging the threads of the conduits. The sections may then be secured to each other by clip members such as M engaged therewith so as to bridge the joint therebetween, as shown in Figure 6. In Figure 8 another form of junction box is illustrated, this being formed of a spirally wound strip having a straight portion N, a flaring portion O and a second straight portion P of larger diameter. The portions N may be screwed onto the ends of the conduit sections to furnish access to the conductor for forming a splice or for any other work to be performed thereon. The two sections may then be screwed on their respective conductors so as to come into engagement with each other and the portions P may be screwed together to form a joint therebetween.

In Figure 9 there is shown a clip construction Q which may be snapped into engagement with the conductor A and then nailed or otherwise secured to any suitable support.

Figure 10 illustrates a connection between conduit sections A and A⁶ differing considerably in diameter, which is formed by a bushing R threaded into engagement with said sections. This bushing may be either a single section of threaded tube of an intermediate diameter, or it may be formed of a series of said tubes of progressively changing diameter which engage each other and the conduit. Figure 12 shows the conduit A engaging a nipple member S formed either of a spirally wound strip or of an integral pressed metal member having a flange T at one end. Such a nipple may be inserted in one of the outlet openings of a conduit outlet box and will form a means of attaching the conduit thereto. Figure 13 shows a cross section for adjacent conduit sections provided with threaded nipples U for engaging coupling sleeves V.

One advantage of coupling conduit sections with a similarly formed spirally wound member is that the coupling as well as the rest of the conduit is flexible. This avoids localizing stresses at the joint, which otherwise might cause a bending or a breaking of the conduit.

What I claim as my invention is:

1. A conduit system comprising a plurality of conduit sections each formed of a spirally wound strip forming external and internal screw-threads and a coupling for said sections of a similar spirally wound strip of different diameter adapted to be screwed into engagement with the threads formed by the spiral windings of said sections.

2. A conduit system comprising a plurality of sections each formed of a spirally wound strip forming external and internal screw threads, of a coupling for said sections formed of a similar spirally wound strip adapted to be screwed into engagement with the external threads of one and the internal threads of another of said sections.

3. A conduit system comprising a conduit section formed of a spirally wound strip forming a screw threaded internal and external surface and a conduit section similarly formed but of a different diameter adapted to be screwed into engagement with said first section.

4. A conduit system comprising a plurality of conduit sections each formed of a spirally wound strip forming screw threaded external and internal surfaces, said sections being of different diameters and a coupling for said sections formed of a similarly spirally wound strip adapted to be screwed into engagement with the external threads of one and the internal threads of the other of said sections.

5. A conduit system comprising a plurality of conduit sections each formed of a spirally wound strip forming screw threaded external and internal surfaces, said sections being of different diameters and a coupling bushing for connecting said sections formed of a similar spirally wound strip of a diameter to form an external threaded engagement with one section and an internal threaded engagement with the other section.

6. A conduit system comprising a plurality of conduit sections each formed of a spirally wound strip forming screw threaded internal and external surfaces, said sections being of different diameters permitting of telescopically engaging one with the other and a bushing for securing said sections to each other formed of a similar spirally wound strip forming an external screw threaded engagement with the small diameter section and an internal screw threaded engagement with the large section said coupling being adapted to be first screwed on to one section and then reversely screwed on said section into engagement with the other section.

In testimony whereof I affix my signature.

JOSEPH H. HUNTER.